United States Patent
Shiba et al.

(10) Patent No.: US 8,428,540 B2
(45) Date of Patent: *Apr. 23, 2013

(54) COMMUNICATION APPARATUS, NOISE CANCELLER, NOISE CANCELING METHOD, AND NOISE CANCELING PROGRAM

(75) Inventors: Akira Shiba, Kawasaki (JP); Shinichi Shiotsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 743 days.

This patent is subject to a terminal disclaimer.

(21) Appl. No.: 12/232,755

(22) Filed: Sep. 23, 2008

(65) Prior Publication Data

US 2009/0181632 A1    Jul. 16, 2009

(30) Foreign Application Priority Data

Jan. 11, 2008    (JP) .................................. 2008-004935

(51) Int. Cl.
H04B 1/10    (2006.01)

(52) U.S. Cl.
USPC ....... 455/296; 455/63.1; 455/114.3; 455/222; 455/283

(58) Field of Classification Search .................. 455/296, 455/501, 506, 514, 63.1, 67.13, 114.1, 115.1, 455/115.4, 185.1, 186.1, 222, 226.1, 226.4, 455/283; 381/13, 3–4, 94.1–94.9
See application file for complete search history.

(56) References Cited

U.S. PATENT DOCUMENTS

| | | | |
|---|---|---|---|
| 5,812,673 A * | 9/1998 | Nohara et al. .................. 381/13 |
| 6,665,526 B2 * | 12/2003 | Tsuji et al. .................... 455/296 |
| 6,915,112 B1 * | 7/2005 | Sutton et al. ............... 455/67.13 |
| 7,158,773 B2 * | 1/2007 | Kurita et al. .................. 455/307 |
| 7,184,498 B2 * | 2/2007 | Moy et al. ..................... 375/346 |
| 7,551,743 B1 * | 6/2009 | Tsujishita et al. ........... 381/94.1 |
| 7,664,455 B2 * | 2/2010 | So et al. ....................... 455/3.01 |
| 7,787,648 B1 * | 8/2010 | Frerking et al. .............. 381/317 |
| 7,929,933 B2 * | 4/2011 | Gozen ......................... 455/226.2 |
| 2002/0044614 A1 * | 4/2002 | Molnar et al. ................ 375/346 |
| 2003/0224751 A1 * | 12/2003 | Vanderhelm et al. ......... 455/296 |
| 2004/0102174 A1 | 5/2004 | Kurita et al. |
| 2004/0185815 A1 | 9/2004 | Fukuda et al. ................ 455/296 |
| 2007/0117529 A1 | 5/2007 | Oe |
| 2007/0173282 A1 | 7/2007 | Noda et al. |

(Continued)

FOREIGN PATENT DOCUMENTS

| | | |
|---|---|---|
| EP | 0228786 | 7/1987 |
| EP | 0371433 | 6/1990 |

(Continued)

OTHER PUBLICATIONS

Japanese Office Action mailed Feb. 21, 2012 issued in corresponding Japanese Patent Application No. 2008-004935.

(Continued)

*Primary Examiner* — Pablo Tran

(74) *Attorney, Agent, or Firm* — Staas & Halsey LLP

(57) ABSTRACT

A communication apparatus includes an I and Q digital values table that stores values of I and Q, which are parameters for noise cancellation determined in advance, for each of reception channels. The communication apparatus reads out parameters for noise cancellation corresponding to a reception channel from the I and Q digital values table. Subsequently, the communication apparatus cancels a noise signal from a reception signal using the read-out parameters for noise cancellation.

6 Claims, 9 Drawing Sheets

U.S. PATENT DOCUMENTS

2009/0197558 A1* 8/2009 Shiotsu et al. ............... 455/296
2011/0059714 A1* 3/2011 Collins et al. ............... 455/296
2011/0075854 A1* 3/2011 Sakamoto et al. ........... 381/71.1

FOREIGN PATENT DOCUMENTS

| EP | 0700166 A2 | 3/1996 |
|---|---|---|
| JP | 2-233026 | 9/1990 |
| JP | 8-335915 | 12/1996 |
| JP | 11-27160 | 1/1999 |
| JP | 2004-228920 | 8/2004 |
| JP | 2004-236171 | 8/2004 |
| JP | 2006-173698 | 6/2006 |
| JP | 2007-243241 | 9/2007 |
| WO | 2006/065883 | 6/2006 |

OTHER PUBLICATIONS

Extended European Search Report dated Mar. 7, 2012 issued in corresponding European Patent Application No. 08165342.0.

Japanese Office Action mailed May 15, 2012 issued in corresponding Japanese Patent Application No. 2008-004935.

* cited by examiner

FIG.3

| ADDRESS | RECEPTION CHANNEL NUMBER | I | Q |
|---|---|---|---|
| 0 | 1 | -63 | 1021 |
| 1 | 2 | -127 | 1015 |
| 2 | 3 | -190 | 1005 |
| 3 | 4 | -253 | 991 |
| 4 | 5 | -314 | 973 |
| 5 | 6 | -375 | 951 |
| 6 | 7 | -434 | 926 |
| 7 | 8 | -491 | 897 |
| ..... | ..... | ..... | ..... |
| 99 | 100 | 5 | 1023 |

FIG.5

```
              START
                │
        ┌───────▼
        │     ╱S101╲
   NO   │   ╱IS COMMUNI-╲
  ◄─────┤  ╱CATION START ╲
        │  ╲ INSTRUCTION ╱
        │   ╲ RECEIVED? ╱
        │    ╲   ╱
        │     ▼ YES    ┌S102
        │  ┌──────────────────┐
        │  │ READ RECEPTION   │
        │  │ CHANNEL NUMBER   │
        │  └────────┬─────────┘
        │           │    ┌S103
        │        ╱     ╲
   NO   │      ╱ HAS RECEPTION╲
  ◄─────┤     ╱ CHANNEL NUMBER ╲
        │     ╲   CHANGED?    ╱
        │      ╲            ╱
        │           │ YES   ┌S104
        │  ┌──────────────────┐
        │  │ READ OUT I AND Q │
        │  │CORRESPONDING TO  │
        │  │RECEPTION CHANNEL │
        │  │NUMBER FROM I AND │
        │  │Q DIGITAL VALUES  │
        │  │TABLE AND OUTPUT  │
        │  │ I AND Q TO DACs  │
        │  └────────┬─────────┘
        └───────────┘
```

FIG.6

| ADDRESS | RECEPTION CHANNEL NUMBER | I | Q |
|---------|--------------------------|------|------|
| 0 | 1 | -63 | 1021 |
| 1 | 2 | -127 | 1015 |
| 2 | 3 | -190 | 1005 |
| 3 | 4 | -253→-200 | 991→1000 |
| 4 | 5 | -314 | 973 |
| 5 | 6 | -375 | 951 |
| 6 | 7 | -434 | 926 |
| 7 | 8 | -491 | 897 |
| ..... | ..... | ..... | ..... |
| 99 | 100 | 5 | 1023 |

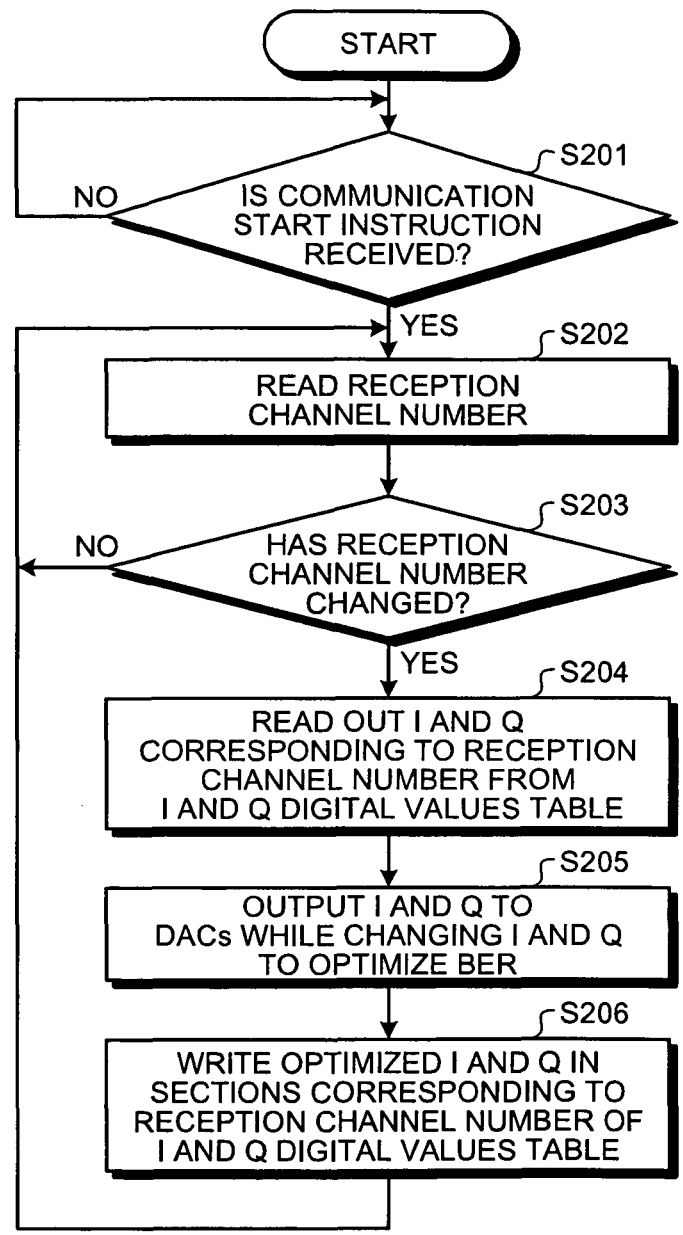

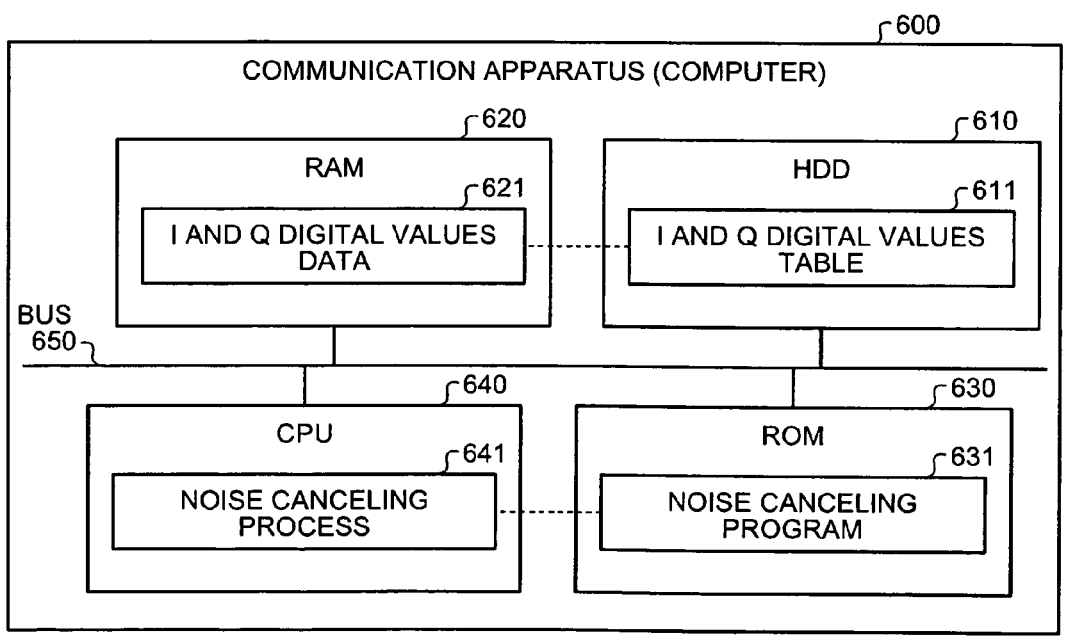

COMMUNICATION APPARATUS, NOISE CANCELLER, NOISE CANCELING METHOD, AND NOISE CANCELING PROGRAM

BACKGROUND OF THE INVENTION

1. Field of the Invention

The present invention relates to a communication apparatus that starts communication after scanning a plurality of reception channels and cancels a noise signal caused by a radio wave noise source from a reception signal received in the communication, a noise canceller, a noise canceling method, and a noise canceling program for the communication apparatus.

2. Description of the Related Art

Conventionally, in communication apparatuses (e.g., a cellular phone and a notebook personal computer) mounted with wireless interfaces such as wideband code divided multiple access (W-CDMA), wireless local area network (WLAN), and 1 seg, when the wireless interfaces are used, radio wave noise from the inside of main bodies of the apparatuses intrudes into antennas of wireless modules. This causes deterioration in a transmission band and interrupts communication.

In recent years, an analog chip that picks up radio wave noise near a noise source and cancels the radio wave noise from a reception signal has been devised (see, for example, Japanese Patent Application Laid-open No. 2004-236171). For example, as a method of canceling radio wave noise from a reception signal, a method of adding, in an anti-phase, radio wave noise from a noise source to a reception signal to thereby cancel the radio wave noise as illustrated in FIG. 11 is known (see Japanese Patent Application Laid-open No. H8-335915).

In the example shown in FIG. 11, to optimize communication quality data output from a global positioning system (GPS) reception module, I and Q signals are combined and anti-phase noise is added to cancel radio wave noise. After communication is started, the I and Q signals are combined while being adapted to optimize communication quality data (e.g., bit error rate (BER)) output from the module to cancel radio wave noise.

Japanese Patent Application Laid-open No. H2-233026 discloses a technology for canceling noise according to a reception channel. Specifically, to optimize an image quality of a received image for each of reception channels, a television receiver determines in advance whether a noise reducing circuit should be activated or inactivated for each of the reception channels and controls the noise reducing circuit according to a tuned-in reception channel.

The technology for adding, in an anti-phase, radio wave noise to a reception signal to thereby cancel the radio wave noise has drawbacks. For example, as in W-CDMA and worldwide interoperability for microwave access (WiMAX), when a plurality of reception channels are scanned in a short time and a reception signal from a base station is received during the start of communication, the reception signal attenuates and a noise signal becomes relatively excessive because the base station is present in a remote location. As a result, the reception signal from the base station cannot be received and communication is not started (see FIG. 12).

When communication is not started, communication quality data cannot be obtained. Therefore, the I and Q signals cannot be adapted and communication cannot be started thereafter.

In the technology disclosed in Japanese Patent Application Laid-open No. H2-233026, an image quality of a received image is merely optimized according to a reception channel. When a reception signal attenuates and a noise signal becomes relatively excessive in a location away from a base station, the reception signal from the base station cannot be received and communication is not started.

SUMMARY

It is an object of the present invention to at least partially solve the problems in the conventional technology.

A communication apparatus according to one aspect of the present invention starts communication after scanning a plurality of reception channels and cancels a noise signal caused by a radio wave noise source from a reception signal received in the communication, and the communication apparatus includes a parameter storing unit that stores parameters for noise cancellation determined in advance for each of the reception channels in a parameter table in association with the reception channels, a parameter readout unit that reads out parameters for noise cancellation corresponding to a reception channel on which reception is about to be started from the parameter table, and a noise canceling unit that cancels a noise signal from the reception signal using the parameters for noise cancellation read out by the parameter readout unit.

A noise canceller according to another aspect of the present invention starts communication after scanning a plurality of reception channels and cancels a noise signal caused by a radio wave noise source from a reception signal received in the communication, and includes a parameter storing unit that stores parameters for noise cancellation determined in advance for each of the reception channels in a parameter table in association with the reception channels, a parameter readout unit that reads out parameters for noise cancellation corresponding to a reception channel on which reception is about to be started from the parameter table, and a noise canceling unit that cancels a noise signal from the reception signal using the parameters for noise cancellation read out by the parameter readout unit.

A noise cancelling method according to still another aspect of the present invention starts communication after scanning a plurality of reception channels and cancels a noise signal caused by a radio wave noise source from a reception signal received in the communication, and includes storing parameters for noise cancellation determined in advance for each of the reception channels in a parameter table in association with the reception channels, reading out parameters for noise cancellation corresponding to a reception channel on which reception is about to be started from the parameter table, and cancelling a noise signal from the reception signal using the parameters for noise cancellation read out at the reading out.

A computer-readable recording medium according to still further aspect of the present invention stores therein a computer program for starting communication after scanning a plurality of reception channels and cancelling a noise signal caused by a radio wave noise source from a reception signal received in the communication, the computer program causes a computer to execute storing parameters for noise cancellation determined in advance for each of the reception channels in a parameter table in association with the reception channels, reading out parameters for noise cancellation corresponding to a reception channel on which reception is about to be started from the parameter table, and cancelling a noise signal from the reception signal using the parameters for noise cancellation read out at the reading out.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an example of an I and Q digital values table included in the communication apparatus according to the first embodiment;

FIG. 5 is a flowchart of processing operations of the communication apparatus according to the first embodiment;

FIG. 6 is a diagram of an example of an I and Q digital values table included in the communication apparatus according to the second embodiment;

FIG. 8 is a flowchart for explaining a processing procedure of the communication apparatus according to the second embodiment;

FIG. 9 is a diagram of an example of an I and Q digital values table included in a communication apparatus according to a third embodiment of the present invention;

FIG. 10 is a diagram of a computer that executes a noise canceling program;

DETAILED DESCRIPTION OF THE PREFERRED EMBODIMENTS

Exemplary embodiments of the present invention are explained in detail below with reference to the accompanying drawings.

Figure 1:
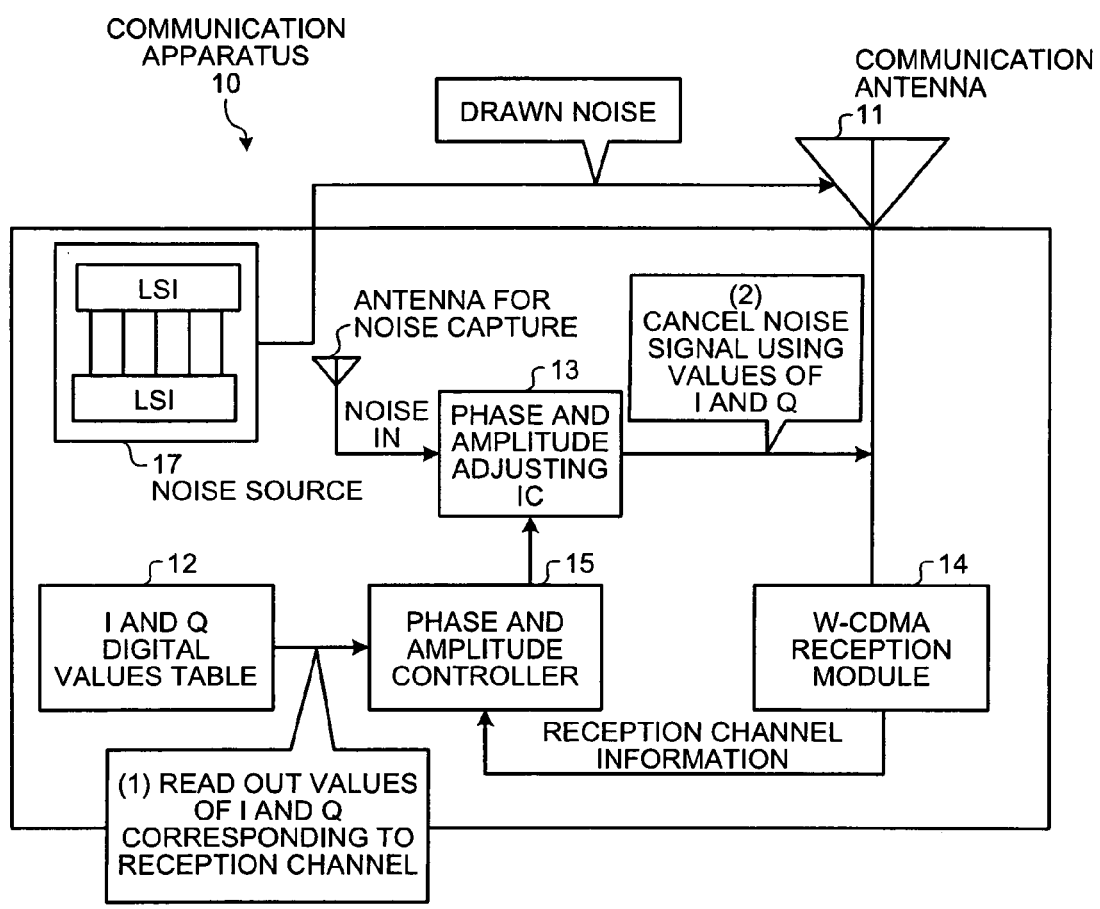
FIG. 1 is a diagram for explaining an overview and characteristics of a communication apparatus according to a first embodiment of the present invention.

FIG. 1 is a diagram for explaining an overview and characteristics of a communication apparatus according to a first embodiment of the present invention. The communication apparatus is applied to a cellular phone or a notebook personal computer mounted with a wireless interface such as W-CDMA, WiMAX, WLAN, or 1 seg.

A communication apparatus 10 according to the first embodiment starts communication after scanning a plurality of reception channels and cancels a noise signal caused by a radio wave noise source from a reception signal received in the communication. The communication apparatus 10 has a main characteristic in scanning the reception channels and starting communication with the noise signal optimally cancelled.

More specifically, as shown in FIG. 1, the communication apparatus 10 includes an I and Q digital values table 12 that stores values of I and Q, which are parameters for noise cancellation determined in advance, for each of reception channels (the I and Q digital values table 12 are explained in detail later with reference to FIG. 3).

The communication apparatus 10 reads out parameters for noise cancellation corresponding to a reception channel from the I and Q digital values table 12 (see (1) in FIG. 1). Specifically, a phase and amplitude controller 15 of the communication apparatus 10 receives reception channel information (see FIG. 1) that indicates a reception channel on which reception is about to be started from a W-CDMA reception module 14. The phase and amplitude controller 15 reads out values of I and Q corresponding to the reception channel from the I and Q digital values table 12 and notifies a phase and amplitude adjusting integrated circuit (IC) 13 of the values.

Subsequently, the communication apparatus 10 cancels a noise signal from a reception signal using the read-out parameters for noise cancellation (see (2) in FIG. 1). Specifically, the phase and amplitude adjusting IC 13 of the communication apparatus 10 picks up a noise signal from a noise source (e.g., a large scale integration (LSI)) 17. The phase and amplitude adjusting IC 13 adjusts the phase and the amplitude of the noise signal and generates a signal using the values of I and Q notified by the phase and amplitude controller 15. Thereafter, the phase and amplitude adjusting IC 13 adds, in an anti-phase, the generated signal to the reception signal received by a communication antenna 11 and cancels noise from the reception signal.

In this way, the communication apparatus 10 cancels the noise signal from the reception signal using the parameters for noise cancellation optimized for each of the channels in advance. Therefore, as indicated by the main characteristic described above, even when the reception signal attenuates and the noise signal becomes relatively excessive in a location away from a base station, the noise signal is optimally cancelled. Therefore, it is possible to scan the reception channels and start communication.

Figure 2:
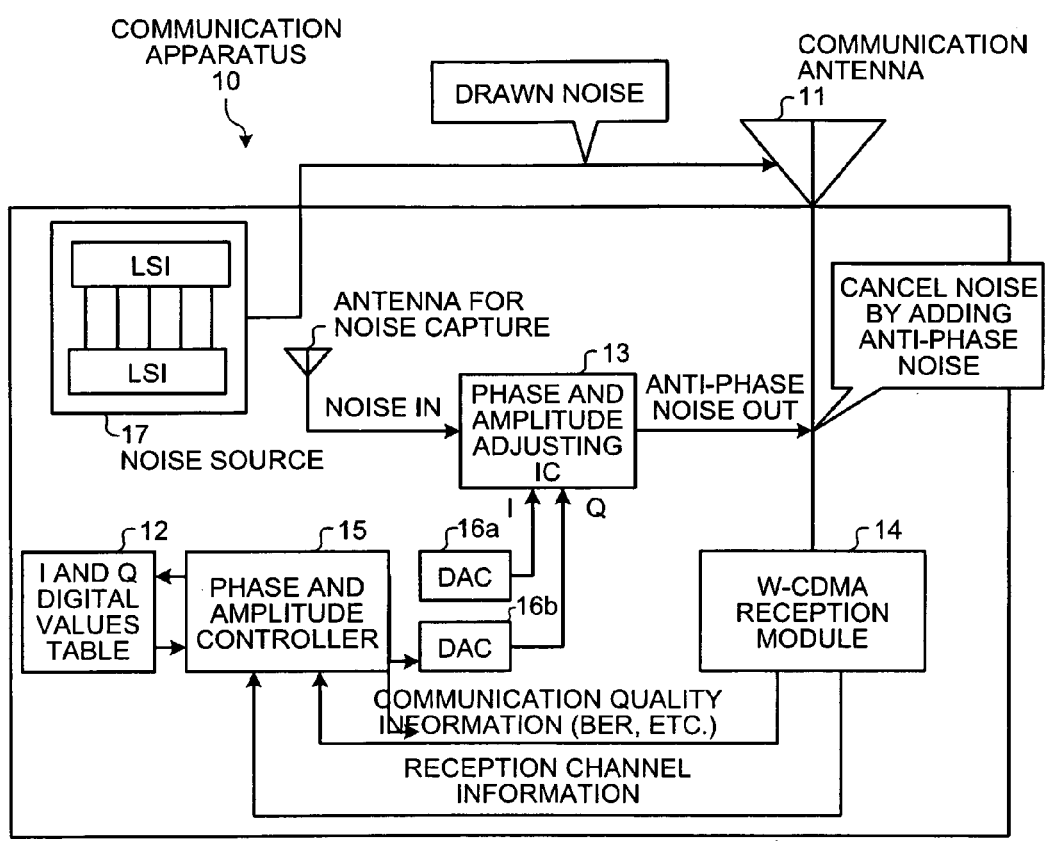
FIG. 2 is a block diagram of a configuration of the communication apparatus according to the first embodiment.
Figure 4:
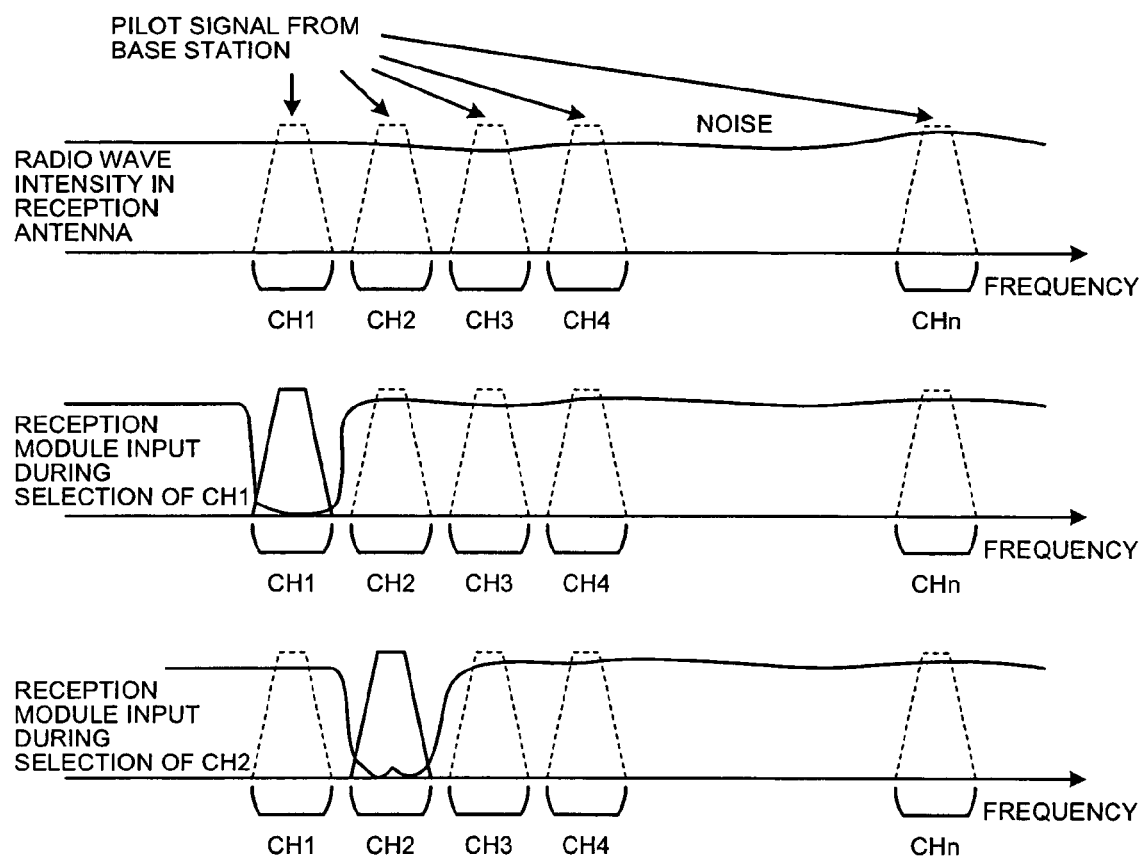
FIG. 4 is a diagram for explaining noise cancellation processing by a communication apparatus according to a second embodiment of the present invention.

FIG. 2 is a block diagram of a configuration of the communication apparatus 10 according to the first embodiment. FIG. 3 is a diagram for explaining an example of the I and Q digital values table 12. FIG. 4 is a diagram for explaining cancellation of noise.

As shown in FIG. 2, the communication apparatus 10 includes the communication antenna 11, the I and Q digital values table 12, the phase and amplitude adjusting IC 13, the W-CDMA reception module 14, the phase and amplitude controller 15, digital to analog converters (DACs) 16a and 16b, and the LSI 17.

The communication antenna 11 receives a radio wave, which is transmitted from the base station, as a reception signal using a predetermined channel. The communication antenna 11 receives a noise signal radiated by the LSI 17, which is a noise source. The DACs 16a and 16b convert values of I and Q, which are received from the phase and amplitude controller 15, from a digital signal into an analog signal and outputs the analog signal to the phase and amplitude adjusting IC 13.

The I and Q digital values table 12 stores values of I and Q, which are parameters for noise cancellation determined in advance for each of reception channels. For example, as shown in FIG. 3, the I and Q digital values table 12 stores an "address" for uniquely identifying a reception channel number, a "reception channel number" that indicates a number of a reception channel, and values of the parameters for noise cancellation "I" and "Q" in association with one another.

In the I and Q digital values table 12, optimum values of "I" and "Q" are set for each of the reception channels in advance. For example, values of I and Q can be set to optimize a bit error rate (BER) even when a simulated base station is used in an anechoic chamber. Alternatively, values of I and Q can be set to optimize noise cancellation in the respective reception channels while manually changing the values of I and Q.

The phase and amplitude controller 15 reads out parameters for noise cancellation corresponding to a reception channel from the I and Q digital values table 12. Specifically, when the phase and amplitude controller 15 reads out reception channel information, which indicates a reception channel on which reception is about to be started, from the W-CDMA reception module 14, the phase and amplitude controller 15 reads out values of I and Q corresponding to the reception channel from the I and Q digital values table 12 and notifies the phase and amplitude adjusting IC 13 of the values via the DACs 16a and 16b.

The phase and amplitude adjusting IC 13 cancels a noise signal from a reception signal using the read-out parameters for noise cancellation. Specifically, the phase and amplitude adjusting IC 13 picks up a noise signal from the LSI 17. The phase and amplitude adjusting IC 13 adjusts the phase and the amplitude of the noise signal and generates a signal using the values of I and Q notified by the phase and amplitude controller 15. Thereafter, the phase and amplitude adjusting IC 13 adds, in an anti-phase, the generated signal to the reception signal received by the communication antenna 11 and cancels noise from the reception signal.

The W-CDMA reception module 14 scans the respective reception channels at high speed, searches for a base station with which the communication apparatus 10 can communicate, and receives a reception signal from the base station via the communication antenna 11. Specifically, the W-CDMA reception module 14 transmits reception channel information, which indicates a reception channel on which reception is about to be started, to the phase and amplitude controller 15 and receives the reception signal from which noise has been cancelled by the phase and amplitude adjusting IC 13.

As shown in FIG. 4, in the W-CDMA system, when appropriate noise cancellation is not performed in a location where a terminal is far away from a base station, a pilot signal from the base station cannot be caught and communication cannot be started even if usable reception channels are scanned.

The communication apparatus 10 reads out, from the I and Q digital values table 12, values of I and Q (e.g., I "−63" and Q "1021") corresponding to a reception channel on which reception is about to be started (e.g., a reception channel "CH1"). The communication apparatus 10 cancels noise using the values of I and Q and scans the reception channel to determine whether the reception channel is a usable reception channel. When the reception channel is a usable reception channel, the communication apparatus 10 starts communication using the reception channel.

When the reception channel is not a usable reception channel, the communication apparatus 10 cancels noise using values of I and Q (e.g., I "−127" and Q "1015") corresponding to the next reception channel (e.g., a reception channel "CH2") and scans the reception channel to determine whether the reception channel is a usable reception channel. Thereafter, the communication apparatus 10 scans reception channels "CH1" to "CHn" in the same manner until a usable reception channel is found.

FIG. 5 is a flowchart of processing operations of the communication apparatus 10 according to the first embodiment.

As shown in the figure, the phase and amplitude controller 15 of the communication apparatus 10 receives a communication start instruction (Yes at step S101). The phase and amplitude controller 15 reads, from the W-CDMA reception module 14, the number of a reception channel on which reception is about to be started (step S102). The phase and amplitude controller 15 judges whether the reception channel number has changed (when a first reception channel number is read, whether the reception channel number is read) (step S103). When the reception channel number has not changed (or the first reception channel number is not read) as a result of the judgment (No at step S103), the phase and amplitude controller 15 returns to step S102.

When the reception channel number has changed (or the first reception channel number is read) as a result of the judgment (Yes at step S103), the phase and amplitude controller 15 reads out values of I and Q corresponding to the reception channel number from the I and Q digital values table 12, and outputs the values to the DACs 16a and 16b (step S104). The phase and amplitude adjusting IC 13 cancels noise of the reception signal.

As described above, the communication apparatus 10 cancels a noise signal from a reception signal using parameters for noise cancellation optimized for each of channels in advance. Therefore, even when the reception signal attenuates and the noise signal becomes relatively excessive in a location away from a base station, the noise signal is optimally cancelled. Therefore, it is possible to scan reception channels and start communication.

In the first embodiment, the optimum values of "I" and "Q" are set for each of the reception channels in advance. However, the present invention is not limited to this. Values of "I" and "Q" set in advance can be changed.

Figure 7:
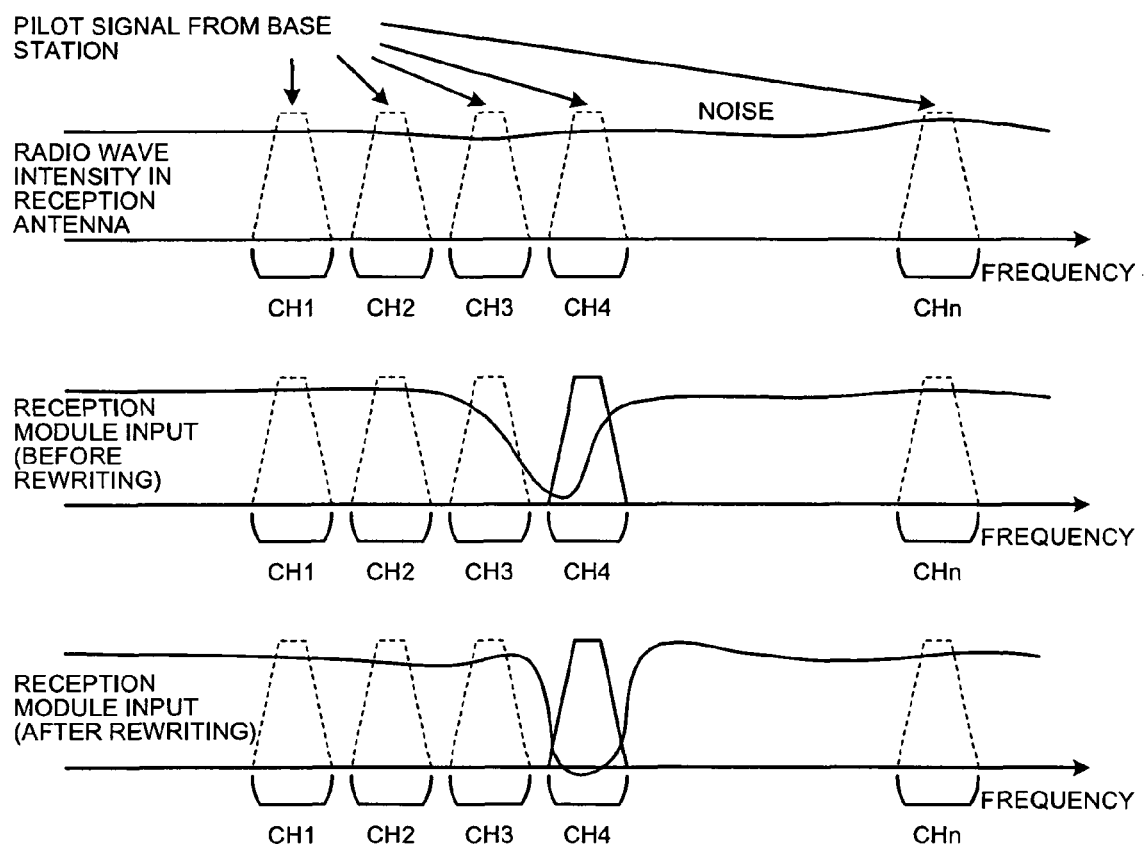
FIG. 7 is a diagram for explaining noise cancellation processing by the communication apparatus according to the second embodiment.
Figure 11:
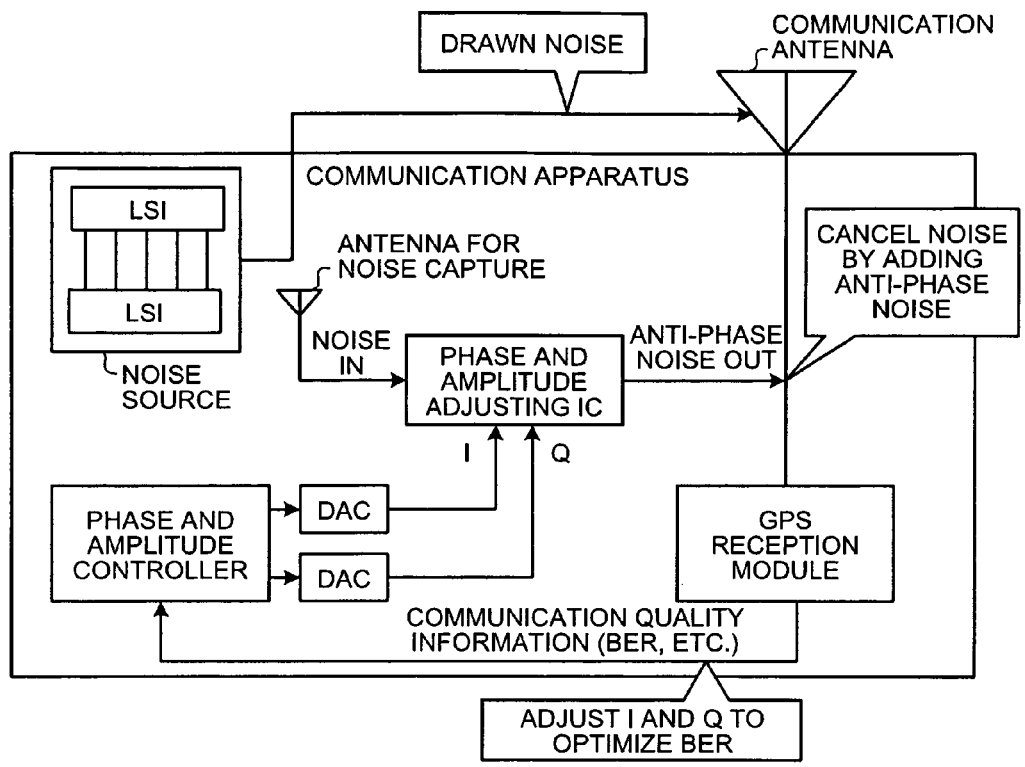
FIG. 11 is a diagram for explaining a technology in the past.
Figure 12:
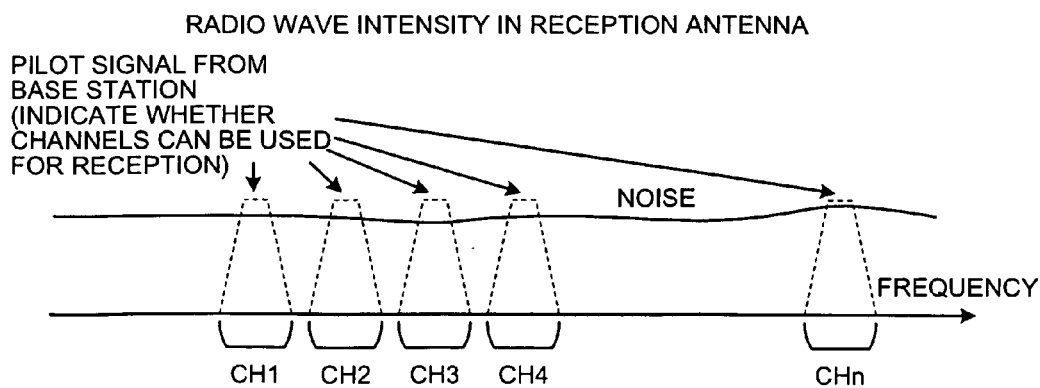
FIG. 12 is a diagram for explaining a technology in the past.

Therefore, in a second embodiment of the present invention, values of "I" and "Q" set in advance are changed according to a BER. FIG. 6 is a diagram of an example of an I and Q digital values table included in a communication apparatus according to the second embodiment. FIG. 7 is a diagram for explaining noise cancellation processing by the communication apparatus according to the second embodiment. FIG. 8 is a flowchart for explaining a processing procedure of the communication apparatus according to the second embodiment.

As shown in FIG. 6, as in the first embodiment, the communication apparatus stores values of "I" and "Q" for each of reception channels set in advance. Unlike the first embodiment, in the I and Q digital values table according to the second embodiment, the values of "I" and "Q" are rewritten by the phase and amplitude controller 15.

Specifically, the phase and amplitude controller 15 of the communication apparatus outputs to the DACs 16a and 16b using communication quality information (e.g., "BER") received from the W-CDMA reception module 14 while changing the values so that the communication quality information is optimized. The phase and amplitude controller 15 writes optimized values of "I" and "Q" in sections corresponding to a reception channel number of the table (in the example shown in FIG. 6, a reception channel number "4").

Consequently, communication in a remote distance, which cannot be reached with values of I and Q before rewriting experimentally set in advance, can be started and communication speed is high from the beginning. As the communication quality information, besides the BER, the values of "I" and "Q" can be changed according to the number of antennas or the like.

Access control processing according to the second embodiment is different from the processing by the communication apparatus 10 according to the first embodiment shown in FIG. 5 in that the values of "I" and "Q" in the I and Q digital values table are rewritten.

As shown in FIG. 8, as in the first embodiment, the phase and amplitude controller 15 of the communication apparatus reads out values of I and Q corresponding to a reception channel number from the I and Q digital values table (step S204). The phase and amplitude controller 15 outputs the values of I and Q to the DACs 16a and 16b while changing the values to optimize a BER received from the W-CDMA reception module 14 (step S205).

The phase and amplitude controller 15 writes the optimized values of I and Q in sections corresponding to the reception channel number of the I and Q digital values table (step S206). In scanning a pilot signal of the base station next time, the phase and amplitude controller 15 uses the rewritten values of I and Q.

In this way, in the second embodiment, communication in a remote distance, which cannot be reached with values of I and Q before rewriting experimentally set in advance, can be started and communication speed is high from the beginning.

The embodiments of the present invention have been explained. However, the present invention can be carried out in various different forms other than the embodiments described above. Therefore, another embodiment included in the present invention is explained below as a third embodiment.

In the first embodiment, values of I and Q, which are parameters for noise cancellation, are set in advance for each of reception channels. However, the present invention is not limited to this. Values of I and Q corresponding to a degree of opening of a cover can be set.

For example, when a cellular phone or a PC is a folding type, a communication antenna may be provided in a cover section. A communication distance and an angle of the communication antenna change according to a degree of opening of the cover. Therefore, as shown in FIG. 9, values of I and Q are set in the I and Q digital values table in association with a degree of opening of the cover (an angle of opening of the cover).

When a communication distance and an angle of the communication antenna change according to a degree of opening of the cover in this way, noise can be optimally cancelled according to the degree of opening of the cover.

The components of the devices shown in the figures are functionally conceptual and are not always required to be physically configured as shown in the figures. A specific form of distribution and integration of the devices is not limited to that shown in the figures. A part or all of the devices can be functionally or physically distributed and integrated in arbitrary units according to various loads and states of use. For example, the phase and amplitude adjusting IC 13 and the phase and amplitude controller 15 can be integrated. Moreover, all or an arbitrary part of the processing functions performed by the devices can be realized by a CPU and a program analyzed and executed by the CPU, or can be realized as hardware by a wired logic.

Among the respective kinds of processing explained in the embodiments, all or a part of the kinds of processing explained as being automatically performed can be manually performed. Alternatively, all or a part of the kinds of processing explained as being manually performed can be automatically performed by a known method. Besides, the processing procedure, the control procedure, the specific names, and the information including the various data and parameters explained above and shown in the figures can be arbitrarily changed unless specifically noted otherwise. For example, the values of the I and Q digital values table 12 can be arbitrarily changed.

The various kinds of processing explained in the embodiments can be realized by executing a program prepared in advance using a computer. FIG. 10 is a diagram of a computer that executes a noise canceling program.

As shown in the figure, a computer 600 as a communication apparatus is configured by connecting a hard disk (HDD) 610, a random access memory (RAM) 620, a read only memory (ROM) 630, and a central processing unit (CPU) 640 through a bus 650.

A noise canceling program 631 that exerts the same functions as the communication apparatuses according to the embodiments is stored in the ROM 630 in advance as shown in FIG. 10. The CPU 640 reads out the noise canceling program 631 from the ROM 630 and executes the same. Consequently, as shown in FIG. 10, the noise canceling program 631 functions as a noise canceling process 641.

An I and Q digital values table 611 is provided in the HDD 610 as shown in FIG. 10. The I and Q digital values table 611 corresponds to the I and Q digital values table 12 shown in FIG. 2. The CPU 640 registers data in the I and Q digital values table 611 and reads out I and Q digital values data 621 from the I and Q digital values table 611 and stores the same in the RAM 620. The CPU 640 executes processing based on the I and Q digital values data 621 stored in the RAM 620.

The apparatus according to the embodiments cancels a noise signal from a reception signal using parameters for noise cancellation optimized for each of channels in advance. Therefore, even when the reception signal attenuates and the noise signal becomes relatively excessive in a location away from a base station, the noise signal is optimally cancelled. Therefore, it is possible to scan reception channels and start communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication apparatus that starts communication after scanning a plurality of reception channels and cancels a noise signal caused by a radio wave noise source from a reception signal received in the communication, the communication apparatus comprising:
   a parameter storing unit that stores parameters for noise cancellation determined in advance for each of the reception channels in a parameter table in association with the reception channels, the parameters being values of I and Q set in advance to optimize noise cancellation in the respective reception channels;
   a parameter readout unit that reads out values of I and Q corresponding to a reception channel on which reception is about to be started from the parameter table;
   a first antenna that picks up a reception signal including a noise signal from the radio wave noise source;
   a second antenna for noise capture that picks up a noise signal from the radio wave noise source;
   an adjusting unit that adjusts the noise signal picked up by the second antenna using the values of I and Q read out by the parameter readout unit; and
   a noise canceling unit that cancels a noise from the reception signal picked up by the first antenna using the noise signal adjusted by the adjusting unit.

2. The communication apparatus according to claim 1, further comprising a parameter updating unit that updates the parameters for noise cancellation stored in the parameter table to reduce communication errors.

3. The communication apparatus according to claim 1, wherein the parameter storing unit stores the parameters for noise cancellation determined in advance for each of the reception channels in the parameter table in association with a degree of opening of a cover section including a communication antenna.

4. A noise canceller that starts communication after scanning a plurality of reception channels and cancels a noise signal caused by a radio wave noise source from a reception signal received in the communication, comprising:

a parameter storing unit that stores parameters for noise cancellation determined in advance for each of the reception channels in a parameter table in association with the reception channels, the parameters being values of I and Q set in advance to optimize noise cancellation in the respective reception channels;

a parameter readout unit that reads out values of I and Q corresponding to a reception channel on which reception is about to be started from the parameter table;

a first antenna that picks up a reception signal including a noise signal from the radio wave noise source;

a second antenna for noise capture that picks up a noise signal from the radio wave noise source;

an adjusting unit that adjusts the noise signal picked up by the second antenna using the values of I and Q read out by the parameter readout unit; and a noise canceling unit that cancels a noise from the reception signal picked up by the first antenna using the noise signal adjusted by the adjusting unit.

5. A noise cancelling method that starts communication after scanning a plurality of reception channels and cancels a noise signal caused by a radio wave noise source from a reception signal received in the communication, comprising:

storing parameters for noise cancellation determined in advance for each of the reception channels in a parameter table in association with the reception channels, the parameters being values of I and Q set in advance to optimize noise cancellation in the respective reception channels;

reading out values of I and Q corresponding to a reception channel on which reception is about to be started from the parameter table;

firstly picking up, by a first antenna, a reception signal including a noise signal from the radio wave noise source;

secondly picking up, by a second antenna, a noise signal from the radio wave noise source;

adjusting the noise signal picked up at the secondly picking using the values of I and Q read out at the reading; and cancelling a noise from the reception signal picked up at the firstly picking using the noise signal adjusted at the adjusting.

6. A non-transitory computer-readable recording medium that stores therein a computer program for starting communication after scanning a plurality of reception channels and cancelling a noise signal caused by a radio wave noise source from a reception signal received in the communication, the computer program causing a computer to execute:

storing parameters for noise cancellation determined in advance for each of the reception channels in a parameter table in association with the reception channels, the parameters being values of I and Q set in advance to optimize noise cancellation in the respective reception channels;

reading out values of I and Q corresponding to a reception channel on which reception is about to be started from the parameter table;

firstly picking up, by a first antenna, a reception signal including a noise signal from the radio wave noise source;

secondly picking up, by a second antenna, a noise signal from the radio wave noise source;

adjusting the noise signal picked up at the secondly picking using the values of I and Q read out at the reading; and cancelling a noise from the reception signal picked up at the firstly picking using the noise signal adjusted at the adjusting.

* * * * *